(12) United States Patent
Testa et al.

(10) Patent No.: US 10,852,484 B2
(45) Date of Patent: Dec. 1, 2020

(54) APPARATUS AND METHOD FOR COUPLING LIGHT

(71) Applicant: TELEFONAKTIEBOLAGET LM ERICSSON (PUBL), Stockholm (SE)

(72) Inventors: Francesco Testa, Pisa (IT); Tommaso Cassese, Pisa (IT); Marco Romagnoli, Pisa (IT); Luigi Tallone, Pisa (IT)

(73) Assignee: TELEFONAKTIEBOLAGET LM ERICCSON (PUBL), Stockholm (SE)

( * ) Notice: Subject to any disclaimer, the term of this patent is extended or adjusted under 35 U.S.C. 154(b) by 0 days.

(21) Appl. No.: 16/477,758

(22) PCT Filed: Jan. 12, 2017

(86) PCT No.: PCT/EP2017/050580
§ 371 (c)(1),
(2) Date: Jul. 12, 2019

(87) PCT Pub. No.: WO2018/130285
PCT Pub. Date: Jul. 19, 2018

(65) Prior Publication Data
US 2019/0369333 A1 Dec. 5, 2019

(51) Int. Cl.
*G02B 6/30* (2006.01)
*G02B 6/42* (2006.01)
(Continued)

(52) U.S. Cl.
CPC .......... *G02B 6/305* (2013.01); *G02B 6/4202* (2013.01)

(58) Field of Classification Search
CPC ........ G02B 6/305; G02B 6/4202; G02B 6/14; G02B 6/1228; G02B 6/1223; G02B 6/12;
(Continued)

(56) References Cited

U.S. PATENT DOCUMENTS 8,031,991 B2 * 10/2011 Webster ............... G02B 6/1228
385/28
8,264,919 B2 * 9/2012 Komura ................. B82Y 20/00
369/13.13
(Continued)

FOREIGN PATENT DOCUMENTS

EP 1148357 A2 10/2001

OTHER PUBLICATIONS

International Search Report and the Written Opinion of the International Searching Authority, issued in corresponding International Application No. PCT/EP2017/050580, dated Oct. 24, 2017, 13 pages.
(Continued)

*Primary Examiner* — Ryan A Lepisto
(74) *Attorney, Agent, or Firm* — Rothwell, Figg, Ernst & Manbeck, P.C.

(57) ABSTRACT

An optical coupler (40; 50) comprises a substrate (41). A first waveguide element (45) is provided in a first layer with respect to the substrate, wherein the first waveguide element (45) comprises a first end (45*a*) and a second end (45*b*), and wherein the first end (45*a*) of the first waveguide element (45) is coupled to input/output light to/from a first end of the optical coupler. A second waveguide element (43) is provided in a second layer, the second layer arranged adjacent to the first layer, wherein the second waveguide element (43) comprises a first end (43*a*) and a second end (43*b*), and wherein the first end (43*a*) of the second waveguide element (43) is coupled to input/output light to/from a second end of the optical coupler. The first waveguide element (45) is configured to extend from the first end of the optical coupler towards the second end of the optical coupler, and the second waveguide element (43) is configured to extend from the second end of the optical coupler towards the first end of the optical coupler, such that the first waveguide element
(Continued)

(45) partly overlaps with the second waveguide element (43) to adapt light passing between the first end (45a) of the first waveguide element (45) and first end (43a) of the second waveguide element (43).

29 Claims, 13 Drawing Sheets

(51) Int. Cl.
*G02B 6/14* (2006.01)
*G02B 6/12* (2006.01)
*G02B 6/122* (2006.01)

(58) Field of Classification Search
CPC .. G02B 6/12002; G02B 6/12004; G02B 6/30; G02B 6/42; G02B 2006/12061; G02B 2006/12038; G02B 2006/12152; G02B 2006/12147; G02B 2006/12195
See application file for complete search history.

(56) References Cited

U.S. PATENT DOCUMENTS

| | | | | |
|---|---|---|---|---|
| 8,320,721 | B2* | 11/2012 | Cevini | G02B 6/305 |
| | | | | 385/28 |
| 8,761,552 | B1 | 6/2014 | Hochberg et al. | |
| 8,873,906 | B2* | 10/2014 | Tokushima | G02B 6/1228 |
| | | | | 264/1.25 |
| 10,393,967 | B2* | 8/2019 | Piazza | G02B 6/1228 |
| 10,429,582 | B1* | 10/2019 | Bian | G02B 6/1228 |
| 2009/0297093 | A1 | 12/2009 | Webster et al. | |
| 2013/0236193 | A1 | 9/2013 | Sengupta | |
| 2015/0316720 | A1 | 11/2015 | Yang et al. | |

OTHER PUBLICATIONS

Zhou et al. "On-chip light sources for silicon photonics" Light: Science & Applications (2015) 4, e358; doi:10.1038/lsa.2015.131, 13 pages.

Picard et al. "Novel Spot-Size Converter for Optical Fiber to sub-μm Silicon Waveguide Coupling with Low Loss, Low Wavelength Dependence and High Tolerance to Alignment" Ecoc 2015—ID: 0076, 3 pages.

Shimizu et al. "High Density Hybrid Integrated Light Source with a Laser Diode Array on a Silicon Optical Waveguide Platform for Inter-Chip Optical Interconnection" IEEE, 2011, pp. 181-183.

Paniccia et al. "A Hybrid Silicon Laser, Silicon photonics technology for future tera-scale computing", White Paper Research at Intel Corporation, 2006, 6 pages.

Hatori et al. "A Hybrid Integrated Light Source on a Silicon Platform Using a Trident Spot-Size Converter" Journal Lightwave Technology, vol. 32, No. 7, Apr. 1, 2014, pp. 1329-1336.

Yamada "Analysis of Optical Coupling for SOI Waveguides" PIERS Online, vol. 6, No. 2, 2010, pp. 165-168.

* cited by examiner

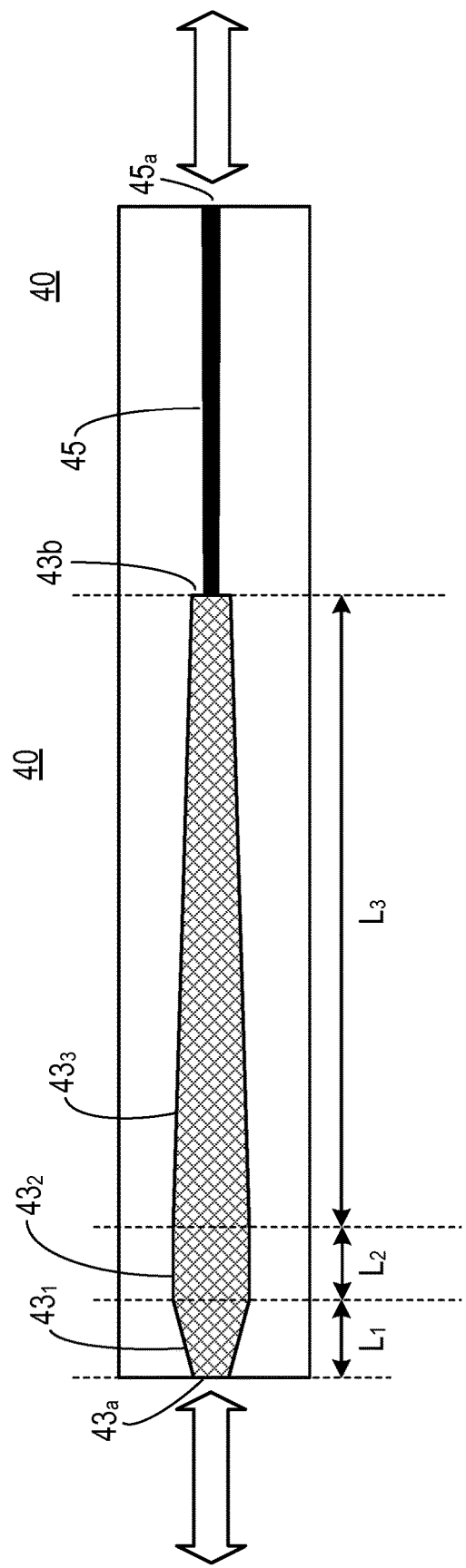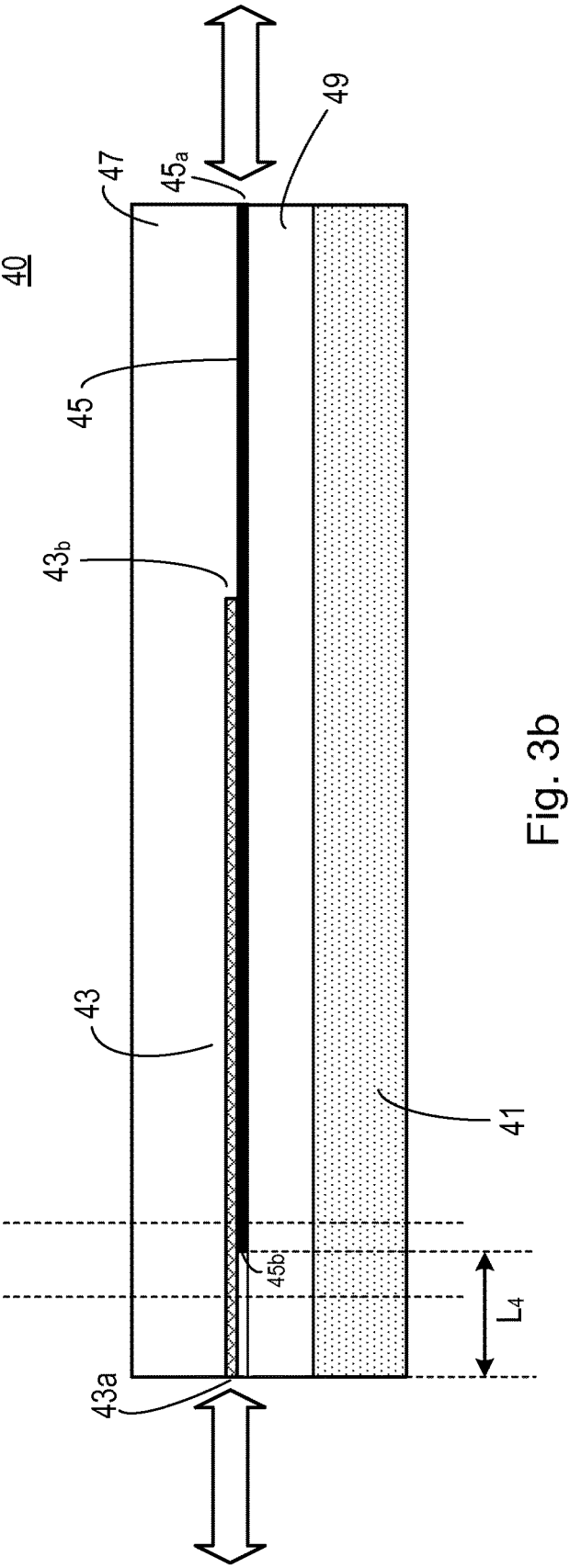

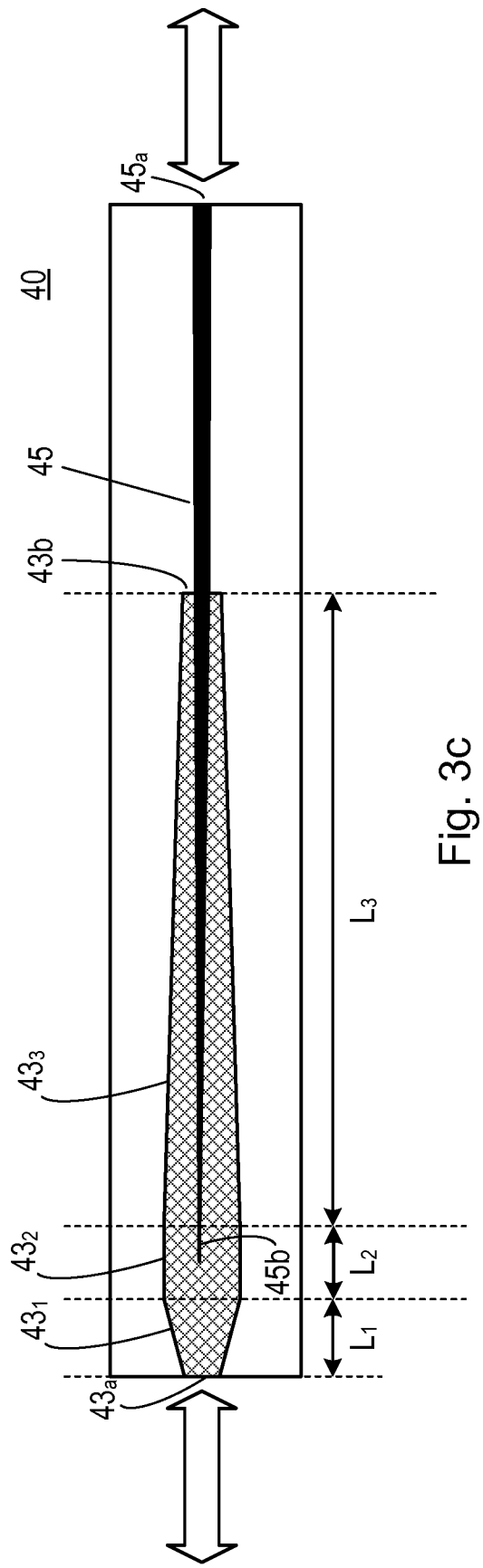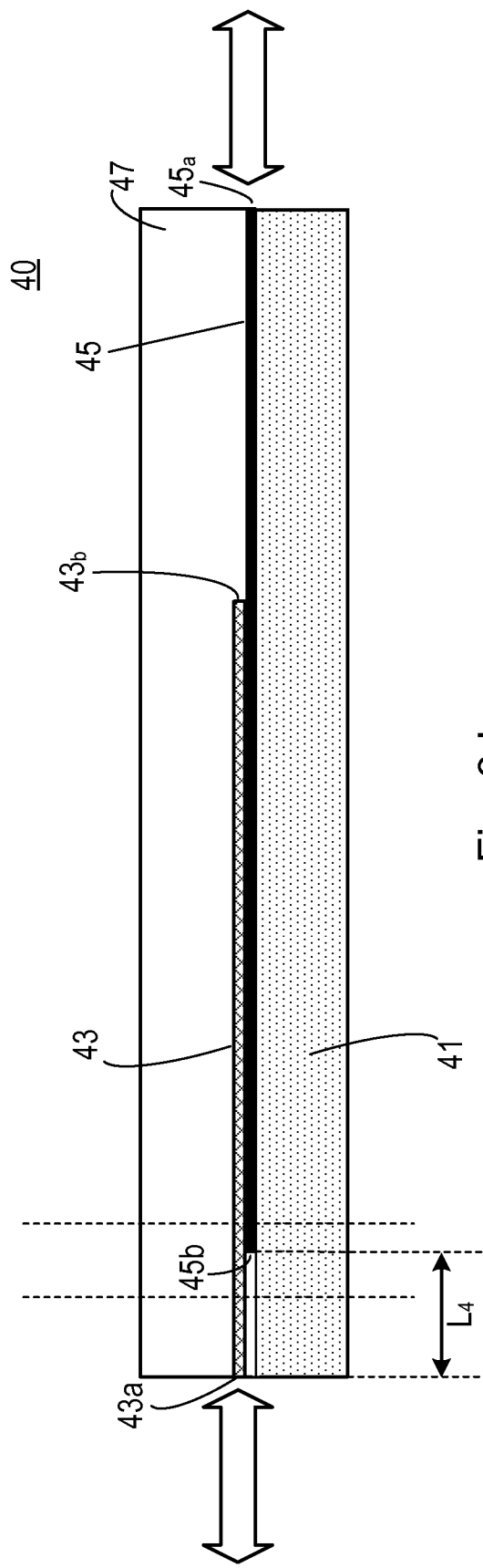

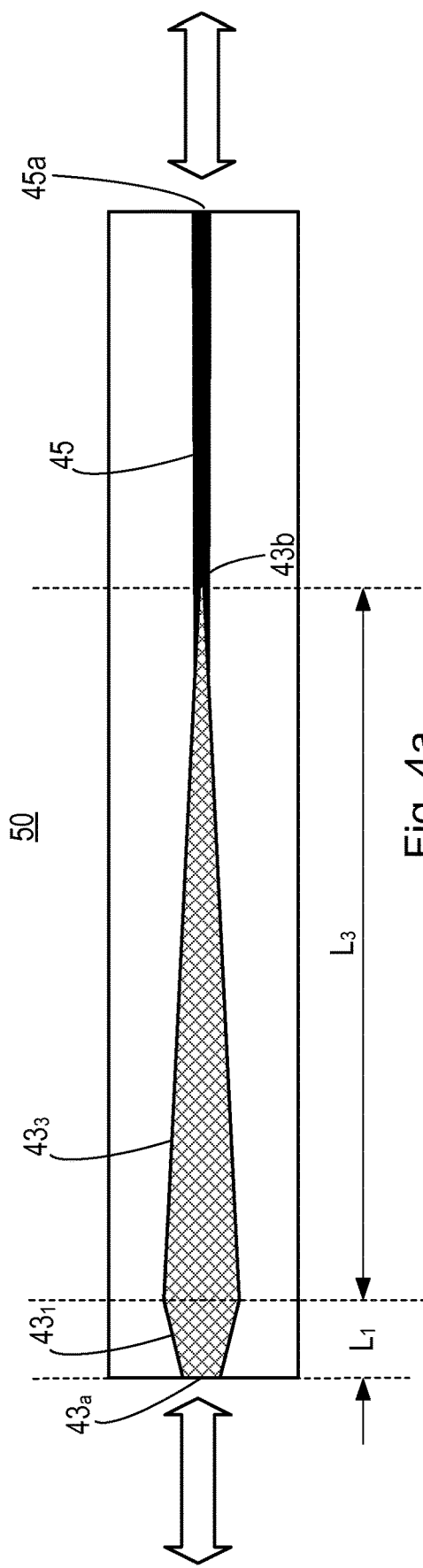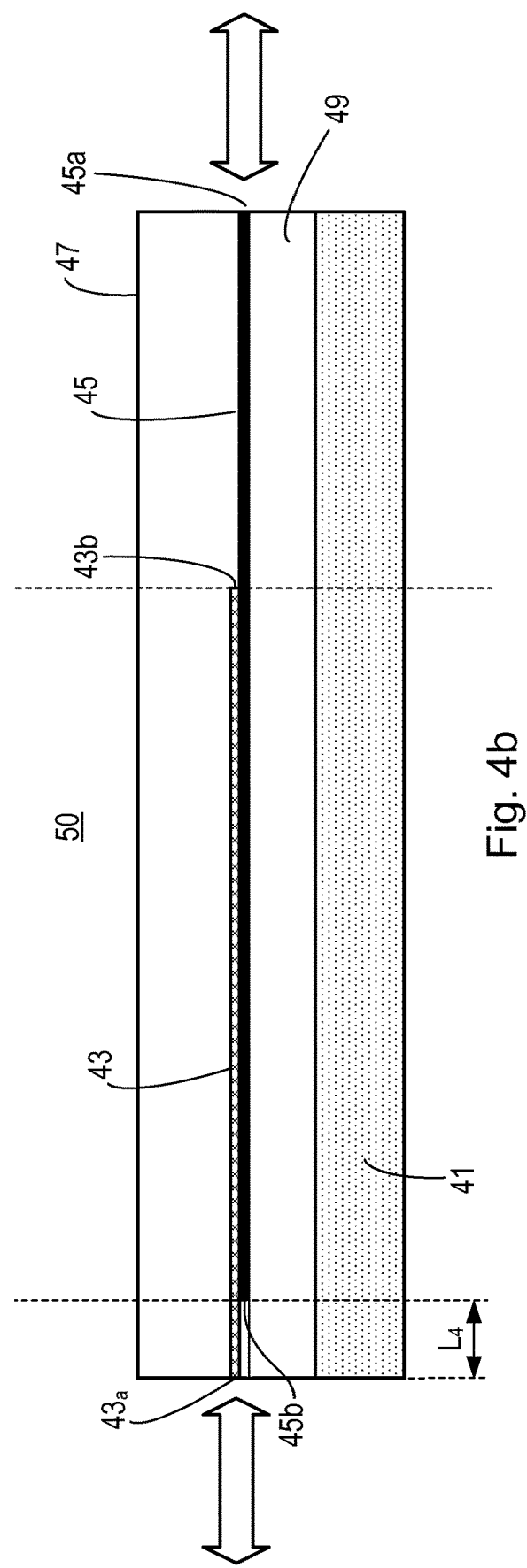

| Horizontal pos[um] | Loss[dB] | Extra loss [dB] |
|---|---|---|
| -2 | 5.35 | 4.58 |
| -1.5 | 3.36 | 2.60 |
| -1 | 1.93 | 1.16 |
| -0.5 | 1.06 | 0.29 |
| 0 | 0.76 | 0.00 |
| 0.5 | 1.05 | 0.29 |
| 1 | 1.92 | 1.16 |
| 1.5 | 3.36 | 2.59 |
| 2 | 5.34 | 4.58 |

| Vertical pos[um] | Loss[dB] | Extra loss [dB] |
|---|---|---|
| -2 | 8.94 | 8.09 |
| -1.5 | 5.64 | 4.80 |
| -1 | 3.24 | 2.39 |
| -0.5 | 1.64 | 0.80 |
| 0 | 0.85 | 0.00 |
| 0.5 | 0.87 | 0.03 |
| 1 | 1.72 | 0.87 |
| 1.5 | 3.37 | 2.53 |
| 2 | 5.85 | 5.01 |

| Distance [um] | Loss[dB] |
|---|---|
| 0.1 | 0.63 |
| 1 | 0.78 |
| 2 | 1.02 |
| 3 | 1.30 |
| 4 | 1.61 |
| 5 | 1.98 |

APPARATUS AND METHOD FOR COUPLING LIGHT

CROSS REFERENCE TO RELATED APPLICATION(S)

This application is a 35 U.S.C. § 371 National Phase Entry Application from PCT/EP2017/050580, filed Jan. 12, 2017, designating the United States, the disclosure of which is incorporated herein by reference in its entirety.

TECHNICAL FIELD

The embodiments described herein relate to an apparatus and method for coupling light, and in particular to an optical coupler and a method of forming an optical coupler.

BACKGROUND

Recent advances in silicon photonics technology, supported by its compatibility with the highly developed complementary-metal-oxide-semiconductor (CMOS) production infrastructure, and by other solutions to specific problems posed by the development of photonics circuits in a silicon substrate (such as laser hybrid integration), is making the realization of a photonic system on chip (PSoC) a reality. A PSoC can be developed by integrating a large number of application specific optical circuits in the same chip of a few squared millimeters to realize high scale optical switching devices or high speed multi-wavelength transceivers or other types of optical processing devices.

However, large integration scale silicon PSoCs have high losses, and the optical interconnect interfaces used in many applications, for example in data centers or in radio access, do not have sufficient power budget to allocate such high losses in the optical networking path. Furthermore, the use of erbium-doped fiber amplifiers (EDFAs) to try and alleviate this issue is not a viable solution due to cost reasons.

The realization of loss-less PSoCs has therefore become necessary, but due to the inability of being able to generate light in silicon material, the light amplification function of the PSoC has to be implemented by hybrid integrating semiconductor optical amplifiers (SOA) with the silicon photonic chip that includes all the other optical processing circuits. A SOA is made, for example, from so called Group III-V semiconductor materials, whereby Group III materials include for example Aluminium (Al), Gallium (Ga) and Indium (In), and whereby Group V materials include for example Nitride (N), Phosphide (P), Arsenide (As) and Antimony (Sb). Similarly, in the case of the realization of PSoCs with complex multi-channel optical transceivers including many lasers, a key aspect is the need of integrating dies with III-V active layers with a silicon chip.

Different techniques have been researched and implemented for SOA/laser hybrid integration, and one feasible solution is based on flip-chip bonding of III-V dies (with SOA and/or laser functions) on a silicon-on-insulator (SOI) substrate. With this technique the facet of the III-V die is butt coupled in front of the silicon waveguide. However, the beam spot size of a silicon waveguide (having normally a size of a few hundred nm, for example) and the beam spot size of the III-V die (normally a few microns, for example) are very different. Therefore, to achieve a low coupling loss between the two, optical coupler devices known as spot size converter (SSC) circuits are used. Key performance figures for the SSCs are: coupling loss, size and alignment tolerance.

FIG. 1 shows an example of a known SSC 10 based on a taper structure. The SSC of FIG. 1 comprises a silicon optical waveguide 1 having an inverse taper. The silicon optical waveguide 1 is surrounded with a non-stoichiometric silica waveguide core 3 that is in turn surrounded by a silica cladding layer 5. This structure is formed on a box layer 7, which is in turn formed on a substrate 9 in silicon over insulator, SOI, wafers. The silicon optical waveguide 1 sits on top of the box layer 7, and is surrounded by the non-stoichiometric silica core 3, e.g. SiOx, which comprises more oxygen atoms in order to slightly increase the refractive index.

FIG. 2 shows another example of a known SSC 20 based on a taper structure. This device comprises three tapered silicon waveguides 1a, 1b, 1c formed in the same layer and structured with the shape of a trident fork, surrounded by a silica cladding layer 5. The structure is formed on a box layer 7, which is in turn formed on a substrate 9 in SOI wafers.

In both the examples of FIG. 1 and FIG. 2, light emitted for example from a III-V chip (not shown) enters the SSC where it is confined inside the silica structure, and during propagation it changes simultaneously the mode shape (e.g. spot size) in order to fit into a silicon nano-waveguide (not shown) that is coupled to the SSC. However, the characteristics of the SSCs of FIGS. 1 and 2 are not optimized for use in high integration scale PSoCs. One reason for this is that the length of such SSCs according to FIGS. 1 and 2 is of the order of several hundred μm, which is not acceptable for application such as those involving integration of many SOAs where two couplers are required at both SOA facets.

Another parameter that needs to be considered in SSC design is that of coupling loss. The coupling loss of the SSCs of FIGS. 1 and 2 with perfect alignment can exceed 2 dB. However, with a misalignment of +/−1 μm, which corresponds to the typical alignment accuracy of a commercial flip-chip machine, total coupling losses that exceed 3 dB have been measured.

Other more complex SSCs exist, but these have the further disadvantage of requiring three or more masking levels in their production.

SUMMARY

It is an aim of the present disclosure to provide a method and apparatus which obviate or reduce at least one or more of the disadvantages mentioned above.

According to a first aspect of the present disclosure there is provided an optical coupler comprising a substrate, and a first waveguide element provided in a first layer with respect to the substrate. The first waveguide element comprises a first end and a second end, and wherein the first end of the first waveguide element is coupled to input/output light to/from a first end of the optical coupler. The optical coupler comprises a second waveguide element provided in a second layer, the second layer arranged adjacent to the first layer, wherein the second waveguide element comprises a first end and a second end, and wherein the first end of the second waveguide element is coupled to input/output light to/from a second end of the optical coupler. The first waveguide element is configured to extend from the first end of the optical coupler towards the second end of the optical coupler, and wherein the second waveguide element is configured to extend from the second end of the optical coupler towards the first end of the optical coupler, such that the first waveguide element overlaps with the second waveguide element to adapt light passing between the first end of the first waveguide element and first end of the second waveguide element.

According to another aspect, there is provided a semiconductor photonic device comprising a first optical module, a second optical module, and an optical coupler as defined above, or any of the other embodiments herein, for coupling light between the first optical module and the second optical module.

According to another aspect of the present disclosure there is provided a method of forming an optical coupler. The method comprises providing a substrate, and forming a first waveguide element in a first layer with respect to the substrate, wherein the first waveguide element comprises a first end and a second end, and wherein the first end of the first waveguide element is coupled to input/output light to/from a first end of the optical coupler. The method comprises forming a second waveguide element in a second layer, the second layer formed adjacent to the first layer, wherein the second waveguide element comprises a first end and a second end, and wherein the first end of the second waveguide element is coupled to input/output light to/from a second end of the optical coupler. The first waveguide element is formed to extend from the first end of the optical coupler towards the second end of the optical coupler, and wherein the second waveguide element is formed to extend from the second end of the optical coupler towards the first end of the optical coupler, such that the first waveguide element overlaps with the second waveguide element to adapt light passing between the first end of the first waveguide element and first end of the second waveguide element.

BRIEF DESCRIPTION OF THE DRAWINGS

For a better understanding of examples of the present disclosure, and to show more clearly how the examples may be carried into effect, reference will now be made, by way of example only, to the following drawings in which:

FIGS. 3a to 3f show an example of an optical coupler according to an embodiment;

FIGS. 4a to 4c show an example of an optical coupler according to an embodiment;

DETAILED DESCRIPTION

Figure 1:
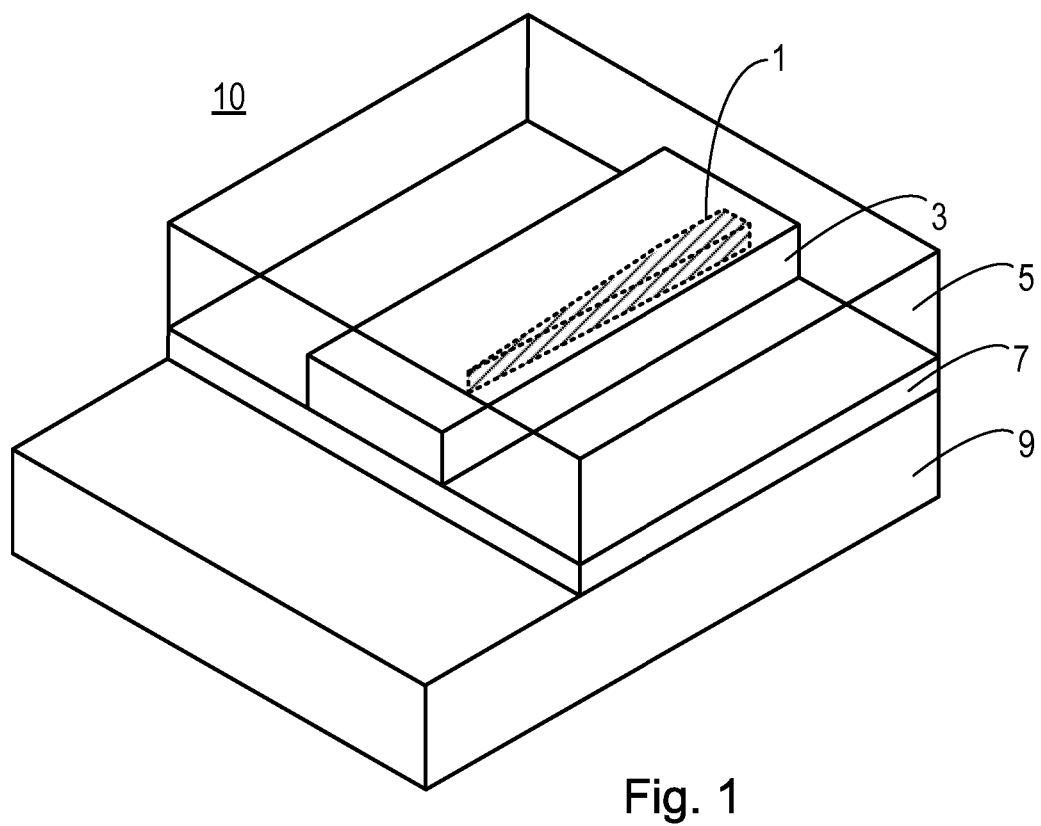
FIG. 1 shows an example of a known spot size converter.
Figure 2:
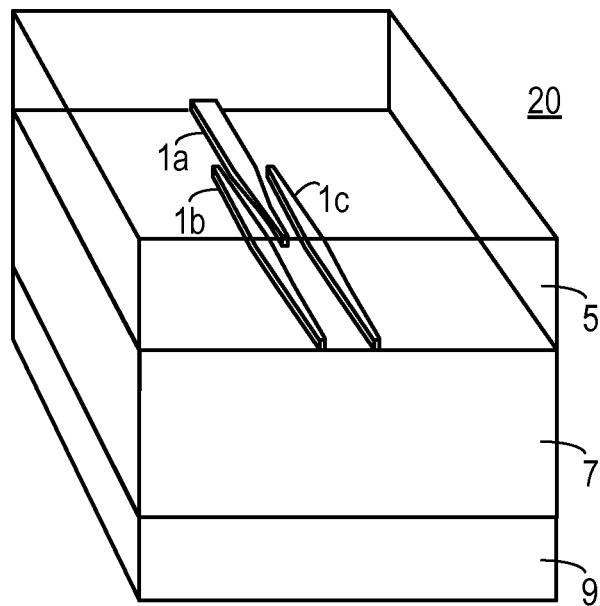
FIG. 2 shows an example of another known spot size converter.

The following sets forth specific details, such as particular embodiments for purposes of explanation and not limitation. But it will be appreciated by one skilled in the art that other embodiments may be employed apart from these specific details. In some instances, detailed descriptions of well known methods, interfaces, circuits, and devices are omitted so as not obscure the description with unnecessary detail.

The embodiments herein will be described in the context of optical couplers for interfacing between first and second light modules, for example for use as spot size converters, for example when interfacing between a first die (such as a Group III-V active die, for example a semiconductor optical amplifier, SOA) and a second die (such as a silicon waveguide in a silicon-on-insulator SOI wafer, for example coupled to a laser). It is noted, however, that the optical couplers described herein may be used for other applications.

FIGS. 3a, 3b and 3c show top, side cross-section and bottom views respectively of an optical coupler 40 according to a first embodiment. Referring to the side cross-sectional view of FIG. 3b, the optical coupler 40 comprises a substrate 41. A first waveguide element 45 is provided in a first layer with respect to the substrate 41, wherein the first waveguide element 45 comprises a first end 45a and a second end 45b. The first end 45a of the first waveguide element 45 is coupled to input/output light to/from a first end of the optical coupler, for example the end of the optical coupler to the right of the page, which may be coupled for example to a light module, such as a silicon waveguide on a SOI wafer. As will be described in greater detail later, in some embodiments where the optical coupler 40 is monolithically formed integrally with another device, then the first waveguide element 45 may be physically coupled, or form an integral part, of a waveguide which the first waveguide element 45 interfaces with.

The optical coupler 40 of FIG. 3b comprises a second waveguide element 43 provided in a second layer, the second layer arranged adjacent to the first layer, wherein the second waveguide element 43 comprises a first end 43a and a second end 43b. The first end 43a of the second waveguide element 43 is coupled to input/output light to/from a second end of the optical coupler, for example the end of the optical coupler to the left of the page, which may be coupled for example to a light module, such as a semiconductor optical amplifier, SOA.

The first waveguide element 45 is configured to extend from the first end of the optical coupler towards the second end of the optical coupler, and the second waveguide element 43 is configured to extend from the second end of the optical coupler towards the first end of the optical coupler, such that the first waveguide element 45 overlaps with the second waveguide element 43 to adapt light passing between the first end 45a of the first waveguide element 45 and first end 43a of the second waveguide element 43. As such, the first waveguide element 45 overlaps with the second waveguide element 43 in a direction parallel to a plane of the substrate 41, but in separate layers, e.g. as shown in FIG. 3b. The first waveguide element 45 also overlaps with the second waveguide element 43 in a direction perpendicular to a plane of the substrate 41, but in separate layers, e.g. as shown in FIG. 3a. The configuration of the optical coupler adapts light passing between the first end 45a of the first waveguide element 45 and first end 43a of the second waveguide element 43. Therefore, light from a light source, for example an external light source, coupled to the first end 43a of the second waveguide element 43 is adapted as it passes through the second waveguide element 43 and the first waveguide element 45 towards the first end 45a of the first waveguide element 45. For example, the second waveguide element 43 and first waveguide element 45 are configured to adapt a mode shape (for example spot size) of an external light source coupled thereto, for example from a SOA.

Referring back to FIG. 3a, corresponding to a top view, more details will now be given of the second waveguide element 43 according to this embodiment. The second waveguide element 43 comprises an expansion region $43_1$, a constant width region $43_2$ (which may be optional, as described later in FIGS. 4a to 4c) and a compression region $43_3$. The expansion region $43_1$ comprises an increasing width from a third width at the first end 43a of the second waveguide element 43 to a larger, fourth width, at an interface with the constant width region $43_2$. The constant width region $43_2$ comprises the fourth width between the expansion region $43_1$ and the compression region $43_3$. The compression region $43_3$ tapers in width from the fourth width to having a smaller, fifth width, at the second end 43b of the second waveguide element 43.

In this way, light entering for example from the left side of the optical coupler, i.e. its second end, expands within the expansion region $43_1$, before passing through the constant width region $43_2$, and before then being compressed by the compression region $43_3$. Due to the first waveguide element 45 being formed in an adjacent layer, which overlaps with the second waveguide element 43, this enables light passing through the second waveguide element 43 to couple into the first waveguide element 45, through evanescent-coupling between the two layers. The first waveguide element 45 guides the light out of the right side of the optical coupler, i.e. via its first end 45a. This may comprise coupling light to a waveguide, including for example a SOI waveguide. As mentioned above, in some embodiments, such a SOI waveguide may be physically coupled to the first waveguide element 45 (for example forming a monolithically integral part thereof), for example where the optical coupler is integrally fabricated as part of a larger semiconductor photonic device comprising the SOI waveguide, for example as described later in FIG. 5. The optical coupler is configured to adapt light in the reverse direction, for light received at the right side of the optical coupler (i.e. first end of the optical coupler, i.e. at the first end 45a of the first waveguide element 45) and coupled to the left side of the optical coupler (i.e. second end of the optical coupler, i.e. the first end 43a of the second waveguide element 43).

In some examples an aspect ratio of the first end 43a of the second waveguide element 43 is less than one, or in some examples substantially less than one. For example, the aspect ratio may less than 0.05. The aspect ratio may be defined as the ratio of the height of the waveguide element to the width of the waveguide element, wherein the height (or depth) is the thickness of the waveguide element perpendicular to the plane of the substrate, i.e. up-down direction in FIG. 3b, and wherein the width is the distance perpendicular to the long axis of the waveguide element, i.e. up-down direction in FIG. 3a. Thus, the height (or depth) of the waveguide element is less than, or substantially less than, its width. In an example where the thickness of the second waveguide element 43 is 70 nm, and the width of the first end 43a of the second waveguide element 43 is 3 μm, the aspect ratio would be 0.02, i.e. an aspect ratio of less than 0.05 as indicated above.

In some examples a numerical aperture of the first end 43a of the second waveguide element 43 may be configured to match the numerical aperture of a light source, for example substantially match, or exactly match an external light source, coupled thereto. Optimal coupling may be achieved when the numerical aperture of the first end 43a of the second waveguide 43 matches the numerical aperture, for example both on the horizontal axis and on the vertical axis, of an input light mode from a light source coupled thereto.

The numerical aperture may be defined as a measure of the acceptance angle of a waveguide and it is a dimensionless quantity. It is most commonly expressed as: Numerical Aperture, NA=SQRT $(n_a^2-n_b^2)$ in which $n_a$ is the index of refraction of the layer forming the second waveguide element 43 and $n_b$ is the index of refraction of a cladding layer 47 (described in further detail later in the application), and where SQRT is a square root function.

The optical coupler 40 is configured with the first waveguide element 45 and the second waveguide element 43 in overlap in adjacent layers. This enables light to pass via evanescent-coupling between the two layers, hence enabling light to be coupled through the optical coupler, i.e. between the respective first and second ends of the optical coupler. In this way the optical coupler can be used, for example, as a spot size converter, SSC, for example to butt-couple between first and second modules that use light having different beam spot sizes.

Referring to FIG. 3c corresponding to a bottom view, in this example the first waveguide element 45 tapers in width from having a first width at its first end 45a to having a second width at its second end 45b. In one example the width of the first waveguide element 45 tapers, e.g. uniformly, from the first width at its first end 45a to a point at its second end 45b. It is noted that the term "width" in the context of the first waveguide element 45 refers to the width of the first waveguide element 45 in the plane of the layer used to form the first waveguide element. The same applies to the term "width" with respect to the second waveguide element 43, as described below.

In the example of FIGS. 3a to 3c it is noted that the optical coupler comprises a third layer 49 interposed between the first waveguide element 45 and the substrate 41, which is best illustrated in the cross-sectional view of FIG. 3b. The third layer 49 comprises a material to help prevent optical signals from entering the substrate 41, and may comprise for example a buried oxide, BOX, layer 49. It is noted, however, that this layer is optional, and may be omitted in some examples, for example as illustrated in the cross-sectional view of FIG. 3d (which shows an optical coupler similar to that of FIG. 3b without a BOX layer 49). For example, the substrate 41 could comprise a material with a refractive index lower than silicon, avoiding the need for a BOX layer. It is noted that the substrate 41 and BOX layer 49 may form a silicon on insulator, SOI, wafer. The BOX layer 49 may comprise, for example, silicon dioxide. The technology used for silicon photonics may be based on SOI wafers that are produced with a BOX layer between a thin silicon layer (in which the optical circuits are formed) and the thick silicon substrate, with the purpose to avoid optical leakage in the silicon substrate. It is noted that a plurality of other layers may be provided between the substrate and the first waveguide element 45, for example to help with etching processes, and/or to help with positioning the first and second waveguides at the appropriate height for a particular application.

Furthermore, it is noted that the embodiments described herein may comprise a layer (not shown) between the first waveguide element 45 and the second waveguide element 43, such that the first waveguide element 45 and second waveguide element are not directly adjacent one another, i.e. not in immediately adjacent layers, but adjacent layers separated by another thin layer. For example, in some examples, the first waveguide element 45 and the second waveguide element 43 may be separated by a thin layer of material, for example silicon dioxide ($SiO_2$), providing a separation of between 0 to 1 μm, for example 70 nm, between the first waveguide element 45 and the second waveguide element 43. Such a layer may be provided in some technological processes, for example where the etching of second waveguide element 43, e.g. made of silicon nitride, can damage the first waveguide element 45 underneath, e.g. made of silicon. For this reason, a very thin layer, e.g. 70 nm of $SiO_2$ may be deposited on top of the silicon layer forming the first waveguide element 45, and then the second waveguide element 43 formed from depositing for example a silicon nitride layer.

Figure 3E:
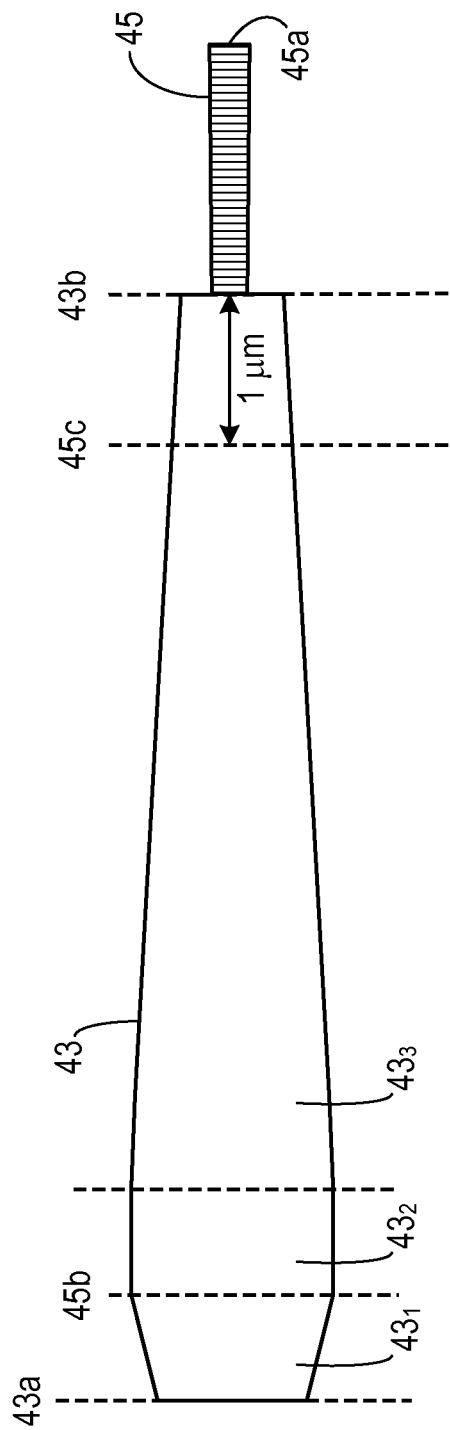
Figure 3F:
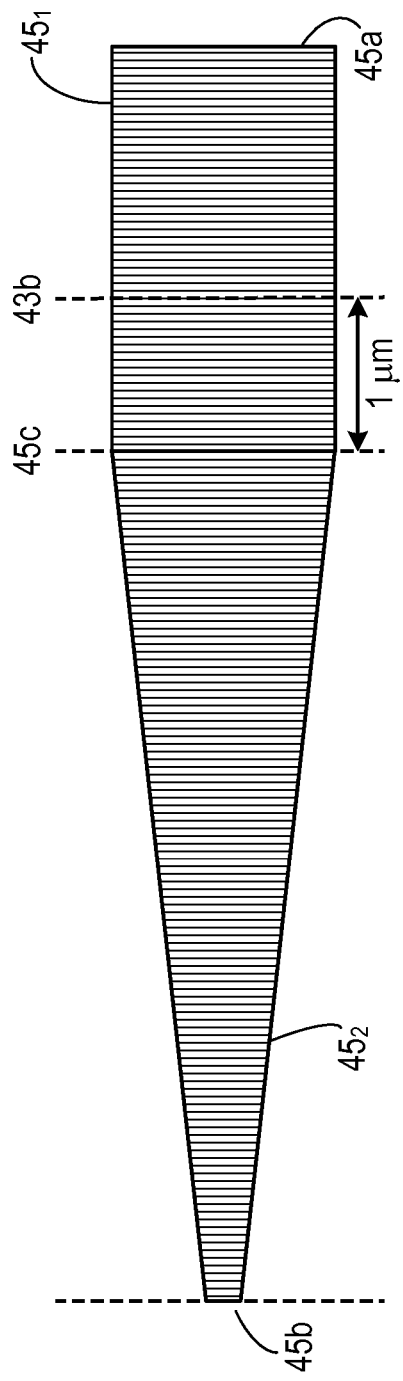

FIG. 3e shows an example of how a first waveguide element 45 may be configured according to another example. For ease of reference only the first and second waveguide elements 45, 43, per se, are shown in FIG. 3e. FIG. 3f shows a view of only the first waveguide element 45 of FIG. 3e, from a bottom side, which has been enlarged in a width-wise direction, to help illustrate this alternative configuration of the first waveguide element 45. The first waveguide element 45 may be configured such that, instead of tapering uniformly from having a first width at its first end 45a to having a second width at its second end 45b (e.g. as shown in FIG. 3c), the first waveguide element 45 may instead be configured to comprise a first section $45_1$, as shown in FIG. 3f, having a constant first width from the first end 45a of the first waveguide element 45, and a taper section $45_2$ that tapers in width from the constant width section $45_1$ to a smaller second width at the second end 45b of the first waveguide element 45.

FIG. 3f therefore illustrates how the first waveguide element 45 in such an embodiment has a constant width section $45_1$, having a first width, between the first end 45a of the first waveguide element 45 and an interface point 45c, and a taper section $45_2$ which tapers from the interface point 45c to the second end 45b of the first waveguide element 45.

As can be seen form FIG. 3e, the second waveguide element 43 comprises an expansion region $43_1$, a constant width region $43_2$ (which may be optional) and a compression region $43_3$.

FIGS. 3e and 3f illustrate how an optical coupler may be configured such that the second end 43b of the second waveguide element 43 is configured to overlap at least partly into the constant width section $45_1$ of the first waveguide element 45, for example 1 μm in the example given. The overlap is provided to allow for manufacturing tolerances in the formation of the length of the second waveguide element 43. In this way, by having an overlap into the constant width section $45_1$, this ensures that the second end 43b of the second waveguide element 43 always extends to at least to the interface point 45c between the taper section $45_2$ and the constant width section $45_1$ of the first waveguide element 45.

It is thus noted that an optical coupler according to an embodiment comprises first and second waveguide elements in adjacent layers of the device (which may or may not be directly adjacent, as mentioned above), wherein the first and second waveguide elements comprise at least a region that taper inversely in opposite directions.

As described above, the width of the first end 43a of the second waveguide element 43 can depend on the mode profile of the incoming/outgoing light coupled to that end of the optical coupler. The width of the second end 43b of the second waveguide element 43 is configured in some examples to be as small as possible in order to obtain a smooth passage from the first waveguide element 45 to the second waveguide element 43 (for example, whereby the second end 43b of the second waveguide element 43 comprises a sharp tip as shown in FIG. 4a described later). However, due to fabrication constraints with forming such a sharp tip, the second waveguide element 43 of the example of FIG. 3a comprises a width at its second end 43b which is larger than a sharp tip, i.e. such that the second waveguide element 43 does not taper to a sharp point, but which does not significantly affect the passage of light between the two waveguides.

In the example of FIGS. 3a to 3c the width of the second end 43b of the second waveguide element 43 is larger than the width of the first end 45a of the first waveguide element 45. For example, the width of the second end 43b of the second waveguide element is three times the first width 45a of the first waveguide element 45. Alternatively, the width of the second end 43b could be smaller depending on the production process, for example equal to the width of the first end 45a of the first waveguide element 45.

In some examples, the width of the first end 43a of the second waveguide element 43 is larger than the width of the first end 45a of the first waveguide element 45, for example about six times the width of the first end 45a of the first waveguide element 45.

The first waveguide element 45 comprises a first length $L_{WG1}$, the first length $L_{WG1}$ being shorter than the overall length of the optical coupler. The second waveguide element 43 comprises a second length $L_{WG2}$, the second length $L_{WG2}$ being shorter than the overall length of the optical coupler. In the example of FIG. 3a the second length $L_{WG2}$ of the second waveguide element 43 comprises the lengths of the expansion region $43_1$, constant width region $43_2$, and the compression region $43_3$, i.e. $L_{WG2}=L_1+L_2+L_3$. In this way, neither of the individual first and second waveguide elements 45, 43 couples directly between the respective ends of the optical coupler. As such, although each of the first and second waveguide elements has a section which overlaps with the other, neither is entirely overlapped by the other in their lengthwise direction.

In one example (not shown), the first waveguide element 45 is configured to overlap with the second waveguide element 43 such that the second end 45b of the first waveguide element 45 is aligned substantially with the interface between the constant width region $43_1$ and the compression region $43_3$ of the second waveguide element 43.

In another example, as shown in the embodiment of FIG. 3c, the first waveguide element 45 is configured to overlap with the second waveguide element 43 such that the second end 45b of the first waveguide element 45 is aligned within boundaries of the constant width region $43_2$ of the second waveguide element 43. The first waveguide element 45 is configured such that its second end 45b is a distance $L_4$ from the second end of the optical coupler 40. By allowing the second end 45b of the first waveguide element 45 to overlap into the constant width region $43_2$, this enables the overall length of the optical coupler to be reduced compared to the length of the optical coupler described in the example above.

In yet another example (not shown), the first waveguide element 45 is configured to overlap with the second waveguide element 43 such that the second end 45b of the first waveguide element 45 overlaps at least partially with the expansion region $43_1$ of the second waveguide element 43. Such an arrangement allows the overall length of the optical coupler to be reduced yet further compared to the length of the optical coupler shown in FIG. 3c.

In some examples, the second end 43b of the second waveguide element 43 overlaps with a taper section of the first waveguide element 45.

In other examples the second end 43b of the second waveguide element 43 overlaps with a taper section 45$_2$ and part of a constant width section 45$_1$ of the first waveguide element 45, for example as described earlier in FIG. 3f.

Figure 4C:
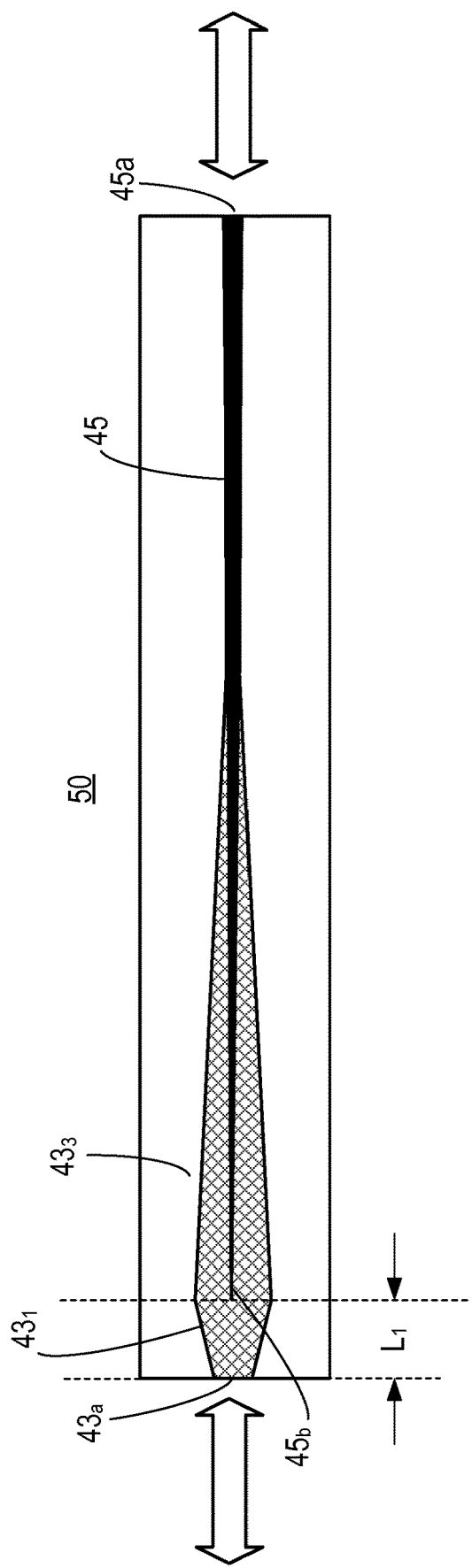

FIGS. 4a, 4b and 4c show top, side cross-section and bottom views of an optical coupler 50 according to another embodiment. Referring to the side cross-sectional view of FIG. 4b, the optical coupler 50 comprises a substrate 41.

As with the embodiment of FIGS. 3a to 3c, a first waveguide element 45 is provided in a first layer with respect to the substrate, wherein the first waveguide element 45 comprises a first end 45a and a second end 45b. The first end 45a of the first waveguide element 45 is coupled to input/output light to/from a first end of the optical coupler, for example the end of the optical coupler to the right of the page, which may be coupled for example, during use, to a silicon waveguide on a SOI wafer.

As above, in the example of FIGS. 4a to 4c it is noted that the optical coupler may comprise a third layer 49 interposed between the first waveguide element 45 and the substrate 41. For example, the optical coupler may comprise a buried oxide, BOX, layer 49 provided on the substrate 41. The substrate 41 and BOX layer 49 may together form a SOI wafer. It is noted, however, that this layer is optional, and may be omitted in some examples. For example, the substrate 41 could comprise a material with a refractive index lower than silicon, avoiding the need for a BOX layer. It is noted that a plurality of other layers may be provided between the substrate and the first waveguide element 45, for example to help with etching processes, and/or to help with positioning the first and second waveguides at the appropriate height for a particular application.

The optical coupler 50 comprises a second waveguide element 43 provided in a second layer, the second layer arranged adjacent to the first layer, wherein the second waveguide element 43 comprises a first end 43a and a second end 43b. The first end 43a of the second waveguide element 43 is coupled to input/output light to/from a second end of the optical coupler, for example the end of the optical coupler to the left of the page, which may be coupled for example, during use, to a semiconductor optical amplifier, SOA.

The first waveguide element 45 is configured to extend from the first end of the optical coupler towards the second end of the optical coupler, and the second waveguide element 43 is configured to extend from the second end of the optical coupler towards the first end of the optical coupler, such that the first waveguide element 45 overlaps with the second waveguide element 43 to adapt light passing between the first end 45a of the first waveguide element 45 and first end 43a of the second waveguide element 43, for example to adapt a mode (such as a spot size) of a light source, e.g. an external light source.

In some examples, an aspect ratio of the first end 43a of the second waveguide element 43 is less than one, or substantially less than one.

In some examples a numerical aperture of the first end 43a of the second waveguide element 43 is configured to match the numerical aperture of an external light source coupled thereto.

Referring to FIG. 4a corresponding to the top view, according to this embodiment the optical coupler 50 comprises an expansion region 43$_1$ and a compression region 43$_3$. The expansion region 43$_1$ comprises an increasing taper (increasing width) from a third width at the first end 43a of the second waveguide element 43 to a larger, fourth width, at an interface with the compression region 43$_3$. The compression region 43$_3$ tapers in a reducing width from the fourth width to having a smaller, fifth width, at the second end 43b of the second waveguide element 43. In this example the fifth width at the second end 43b of the second waveguide element 43 comprises a point. In this example, the second waveguide element 43 does not comprise a region of constant width.

The first waveguide element 45 comprises a first length $L_{WG1}$, the first length $L_{WG1}$ being shorter than the length of the optical coupler. The second waveguide element 43 comprises a second length $L_{WG2}$, the second length $L_{WG2}$ being shorter than the length of the optical coupler. In the example of FIG. 4a the second length $L_{WG2}$ of the second waveguide element 43 comprises the lengths of the expansion region 43$_1$ and the compression region 43$_3$, i.e. $L_{WG2}=L_1+L_3$. In this way, neither of the individual first and second waveguide elements 45, 43 couples directly between the respective ends of the optical coupler. As such, in some embodiments although each of the first and second waveguide elements has a section which overlaps with the other, neither is entirely overlapped by the other.

In one example, as shown in FIG. 4c, the first waveguide element 45 is configured to overlap with the second waveguide element 43 such that the second end 45b of the first waveguide element 45 is aligned substantially with the interface between the expansion region 43$_1$ and the compression region 43$_3$ of the second waveguide element 43.

In another example (not shown), the first waveguide element 45 is configured to overlap with the second waveguide element 43 such that the second end 45b of the first waveguide element 45 overlaps at least partially with the expansion region 43$_1$ of the second waveguide element 43. Such an arrangement allows the overall length of the optical coupler to be reduced compared to the length of the optical coupler shown in FIG. 4c.

In these examples of FIG. 4c, the first waveguide element 45 does not comprise a region of constant width, although it is noted that in alternative embodiments the first waveguide element 45 may have a constant width section, for example as described above in FIG. 3f.

In the embodiments of FIGS. 3a to 3f, and 4a to 4c, according to some examples the first waveguide element 45 comprises a constant thickness in the first layer, and/or the second waveguide element 43 comprises a constant thickness in the second layer.

In some examples the second waveguide element 43 has a width which is greater than the thickness of the second waveguide element 43, for example whereby the width is substantially greater than the thickness. This allows the second waveguide element 43 to be fabricated more easily by deposition. This is possible because the shape of the second waveguide element 43 can be made to match the mode shape of an external light module coupled thereto, for example a SOA/Laser that is oval.

In some examples, for the first waveguide element 45, the width of its second end 45b is about one half of the thickness of the first waveguide element 45, and whereby the width of the first end 45a of the first waveguide element 45 is about twice the thickness of the first waveguide element. In some examples the aspect ratio of the first and second ends 45a and 45b do not present issues during fabrication, for example in examples whereby the first waveguide element 45 is formed by etching of a silicon layer in a SOI wafer.

In the embodiment of FIGS. 4a, 4b and 4c, the relationship between the various widths is as follows:

the width of the second waveguide element 43, at the intersection between the expansion region 43$_1$ and the compression region 43$_3$ is larger, for example about 1 μm larger, than the width of the second waveguide element 43 at its first end 43a;

the width of the second end 43b of the second waveguide element 43 depend on technological processes used for manufacture, and may be smaller than the width of the first end 43a.

It can be seen from the embodiments of FIGS. 3a to 3f and 4a to 4c that the first end 45a of the first waveguide element 45 abuts the first side (right side in the Figures) of the optical coupler, and that the first end 43a of the second waveguide element 43 abuts the second side of the optical coupler (the left side in the Figures), such that light can be coupled between the first and second ends of the optical coupler.

In some embodiments, the optical coupler comprises a cladding layer 47 surrounding the first waveguide element 45 and second waveguide element 43. The material used for the cladding layer 47 can be the same as the BOX layer 49 (for example silica), but while the BOX layer 49 may be a complete layer that is made by the wafer production, the cladding layer 47 may be formed by deposition by a chip manufacturer in well-defined areas of the chip. In some examples the refractive index of the cladding layer 47 is higher than the refractive index of the BOX layer 49, and lower than the refractive index of the second waveguide element 43. This is in order to lift the mode of operation slightly upwards and to avoid residual optical power from entering the substrate 41. The cladding layer 47 may comprise, for example, a silica, for example silicon dioxide, $SiO_2$. In other examples, the cladding layer 47 comprises a non-stoichiometric silicon dioxide, SiOx, (having a refractive index higher than silica).

In some examples the first waveguide element 45 is formed of silicon, Si.

In some examples the second waveguide element 43 is formed from a material having a refractive index higher than a cladding layer surrounding the waveguide, for example a refractive index higher than a silica cladding layer. For example, the second waveguide element 43 may be formed of silicon nitride, $Si_3N_4$.

Using silicon nitride as material for the second waveguide element 43 in combination with silicon for the first waveguide element 45 has an advantage that the value of the refractive index of silicon nitride (~2) is lower than that of the silicon used for the first waveguide element, but higher than that of the cladding material, for example silica. For this reason, the optical mode is strongly confined near the silicon structure and the coupling of optical power into the SOI waveguides below is faster and requires smaller length. Thus, according to one embodiment there is provided a spot size converter comprising a first waveguide made of silicon nitride in a first layer, and a second waveguide made of silicon in a second layer, wherein the first and second waveguides have inversely tapering sections.

The use of silicon nitride also has the advantage of being compatible with a CMOS fabrication process.

As mentioned earlier, an optical coupler according to the examples described herein may comprise a spot-size converter, SSC, for coupling light between a first module having a light signal comprising a first mode shape (or having a first spot size), for example a semiconductor amplifier, SOA, and a second module having a light signal comprising a second mode shape (or a second spot size), for example a laser module.

Figure 5:
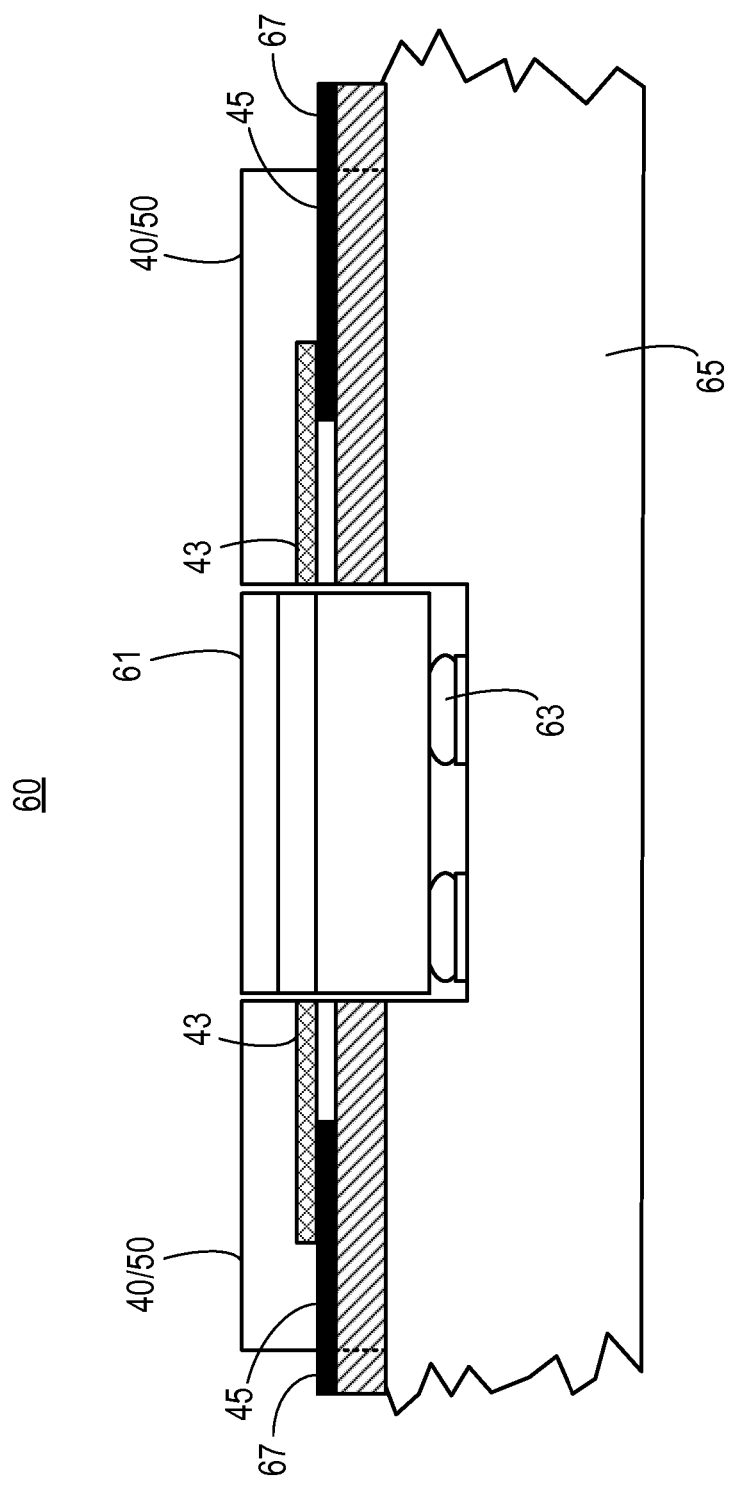
FIG. 5 shows an example of an optical coupler in use.

FIG. 5 shows an example of a semiconductor photonic device 60, for example a photonic system on chip, PSoC, comprising one or more optical couplers 40; 50, for example as described in any one of the examples described herein. The semiconductor photonic device 60 further comprises an active device, for example a semiconductor optical amplifier, SOA, or a laser module 61. The SOA or laser module 61 may be bonded on a substrate 65, for example using CMOS techniques (for example flip-chip bonding using bump bonds 63). In this example the optical couplers 40; 50 are monolithically integrated in the silicon chip 60. In such an application the optical couplers 40; 50 couple light between the SOA/laser module 61 and silicon waveguides 67 in the chip 60. In such an example where the optical couplers 40; 50 form a monolithically integrated part of the larger silicon chip 60, the first waveguide element 45 of an optical coupler 40; 50 is therefore physically coupled to the waveguides 67 of the silicon chip 60. Thus, in effect there is a continuity between a first waveguide element 45 of an optical coupler 40; 50 and a waveguide 67 of the integrated silicon chip. In some examples they have the same width and height, for example once the first waveguide elements 45 have become a constant width, e.g. after mode conversion has occurred. In some examples the second waveguide elements 43 may be extended compared to the examples described previously, for example by 1 μm, to allow for production tolerance problems. In an example where the flip-chip bonded device 61 comprises a SOA, a laser light (which may be part of the PSoC or separate) entering from the waveguide 67 on the left of the device passes via an optical coupler 40; 50 to the SOA 61. In examples where the flip-chip bonded device comprises a SOA, light can be received by the SOA 61 from the waveguide 67 on the west side or the waveguide 67 on the east side of FIG. 5, i.e. such that the circuit of FIG. 5 is symmetrical. In some examples where the flip-chip bonded device 61 comprises a laser, an optical coupler 40; 50 may be provided on one side only. For example, if a laser has a mirror in one facet, an optical coupler 40; 50 is not needed on that side.

Figure 6B:
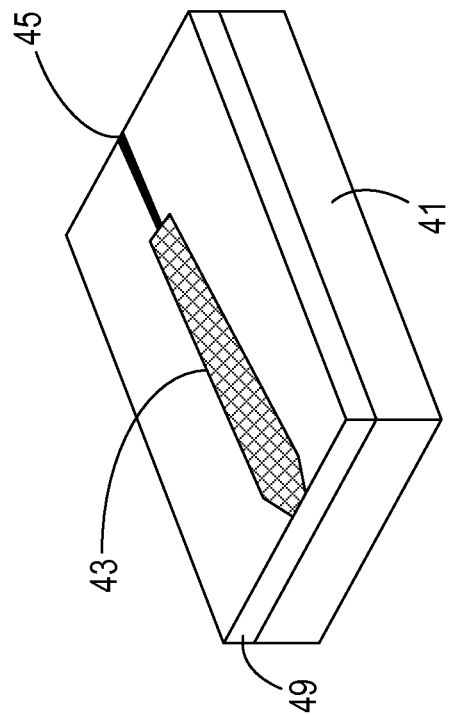
FIGS. 6a and 6b shows an example of an optical coupler during different stages of manufacture.
Figure 6A:
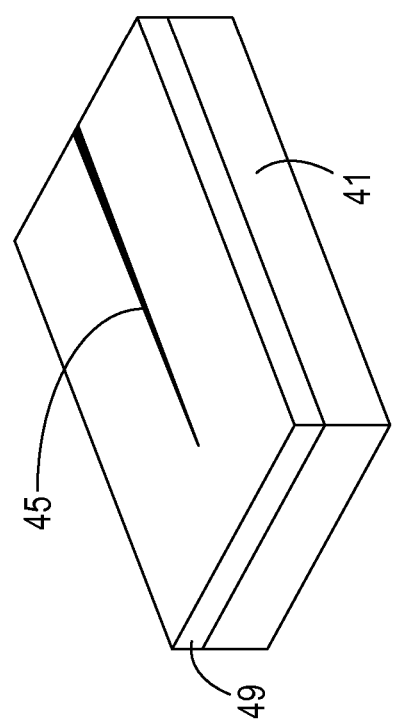

The optical couplers described herein may be fabricated, for example, using CMOS processing techniques. Referring to FIGS. 6a and 6b, FIG. 6a shows part of the optical coupler during the manufacturing stages, whereby a box layer 49 has been formed on the substrate 41, and the first waveguide element 45 formed on the box layer. As will be familiar to a person skilled in the art, the first waveguide element 45 may be formed for example in a thin silicon layer on top of the box layer 49, by applying a mask having the desired shape of the first waveguide element 45, and then etching away the unwanted areas of the silicon layer to leave the desired first waveguide element. In practice the starting point of the manufacture process may be a SOI wafer comprising the substrate 41, BOX layer 49 and a thin silicon layer on top, from which the first waveguide element 45 is etched. Similar etching techniques can be used to form the second waveguide element 43 over the first waveguide element 45, as shown in FIG. 6b, for example by depositing a silicon nitride layer, applying a mask, and etching away to leave the second waveguide element 43.

It is noted that one or more areas of sacrificial material or other layers (for example etch stop layers) may be deposited during the formation steps, for example to provide a planar surface onto which a subsequent layer may be formed (for example between the stages of forming the first waveguide element and the second waveguide element).

Figure 7:
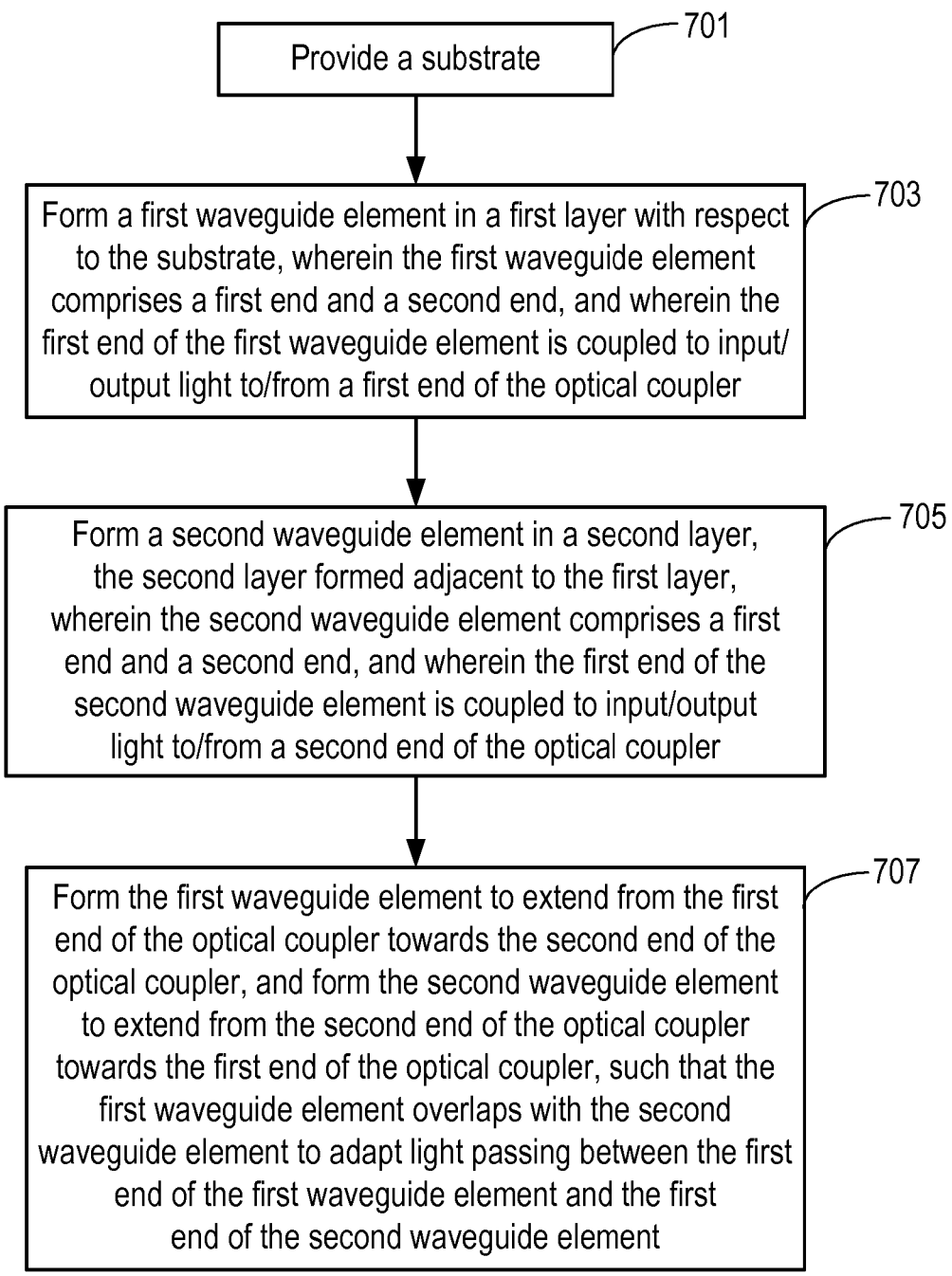
FIG. 7 shows an example of a method according to an embodiment.

Referring to FIG. 7, according to another aspect there is provided a method of forming an optical coupler, for example an optical coupler 40 as described in FIGS. 3a to 3f, or an optical coupler 50 as described in FIGS. 4a to 4c. The method comprises providing a substrate 41, step 701.

The method comprises forming a first waveguide element 45 in a first layer with respect to the substrate, step 703, wherein the first waveguide element 45 comprises a first end 45a and a second end 45b, and wherein the first end 45a of the first waveguide element 45 is coupled to input/output light to/from a first end of the optical coupler.

The method comprises forming a second waveguide element 43 in a second layer, the second layer formed adjacent to the first layer, step 705, wherein the second waveguide element 43 comprises a first end 43a and a second end 43b, and wherein the first end 43a of the second waveguide element 43 is coupled to input/output light to/from a second end of the optical coupler.

The method comprises forming the first waveguide element to extend from the first end of the optical coupler towards the second end of the optical coupler, and forming the second waveguide element 43 to extend from the second end of the optical coupler towards the first end of the optical coupler, such that the first waveguide element 45 overlaps with the second waveguide element 43 to adapt light passing between the first end 45a of the first waveguide element 45 and first end 43a of the second waveguide element 43, step 707. As such, the optical coupler is configured to adapt, for example, a mode (such as a spot size) between the first end 45a of the first waveguide element 45 and first end 43a of the second waveguide element 43.

In practice, as mentioned above, according to some examples the starting point of the method is not the formation of a substrate per se, but a SOI wafer that comprises a thin crystalline silicon layer on top (into which the first waveguide element 45 is etched), a BOX (e.g. silicon dioxide) layer underneath and a thick silicon substrate 41 on the bottom.

The second waveguide element 43 may be formed such that an aspect ratio of the first end 43a of the second waveguide element 43 is less than one, or substantially less than one.

The second waveguide element 43 may be formed such that a numerical aperture of the first end 43a of the second waveguide element 43 is configured to match the numerical aperture of an external light source coupled thereto.

The first waveguide element 45 may be formed to taper from having a first width at its first end 45a to having a second width at its second end 45b.

In one embodiment, the second waveguide element may be formed to comprise an expansion region $43_1$ and a compression region $43_3$, wherein forming the expansion region $43_1$ comprises forming an increasing taper/width from a third width at the first end 43a of the second waveguide element 43 to a larger, fourth width, at an interface with the compression region $43_3$, and wherein forming the compression region $43_3$ comprises forming a taper from the fourth width to a smaller, fifth width, at the second end 43b of the second waveguide element.

In another embodiment, the second waveguide element 43 may be formed to comprise an expansion region $43_1$, a constant width region $43_2$, and a compression region $43_3$. Forming the expansion region $43_1$ comprises forming an increasing taper/width from a third width at the first end 43a of the second waveguide element 43 to a larger, fourth width, at an interface with the constant width section $43_2$, and wherein forming the constant width region $43_2$ comprises forming a region having the fourth width between the expansion region $43_1$ and the compression region $43_3$, and wherein forming the compression region $43_3$ comprises forming a taper from the fourth width to a smaller, fifth width, at the second end 43b of the second waveguide element 43.

The first waveguide element 45 and second waveguide element 43 of the optical coupler may be formed using first and second masks using complementary metal oxide semiconductor, CMOS, processing techniques.

Referring to FIGS. 8, 9a to 9b and 10a to 10b and 11, a specific design example has been investigated and simulated in order to evaluate the performances of a SSC according to the examples described herein, and in particular the effects of thickness tolerance, alignment tolerance and spacing tolerance. The design parameters of the SSC have been optimized by the use of Finite Difference Time Domain (FDTD) simulations.

Figure 8:
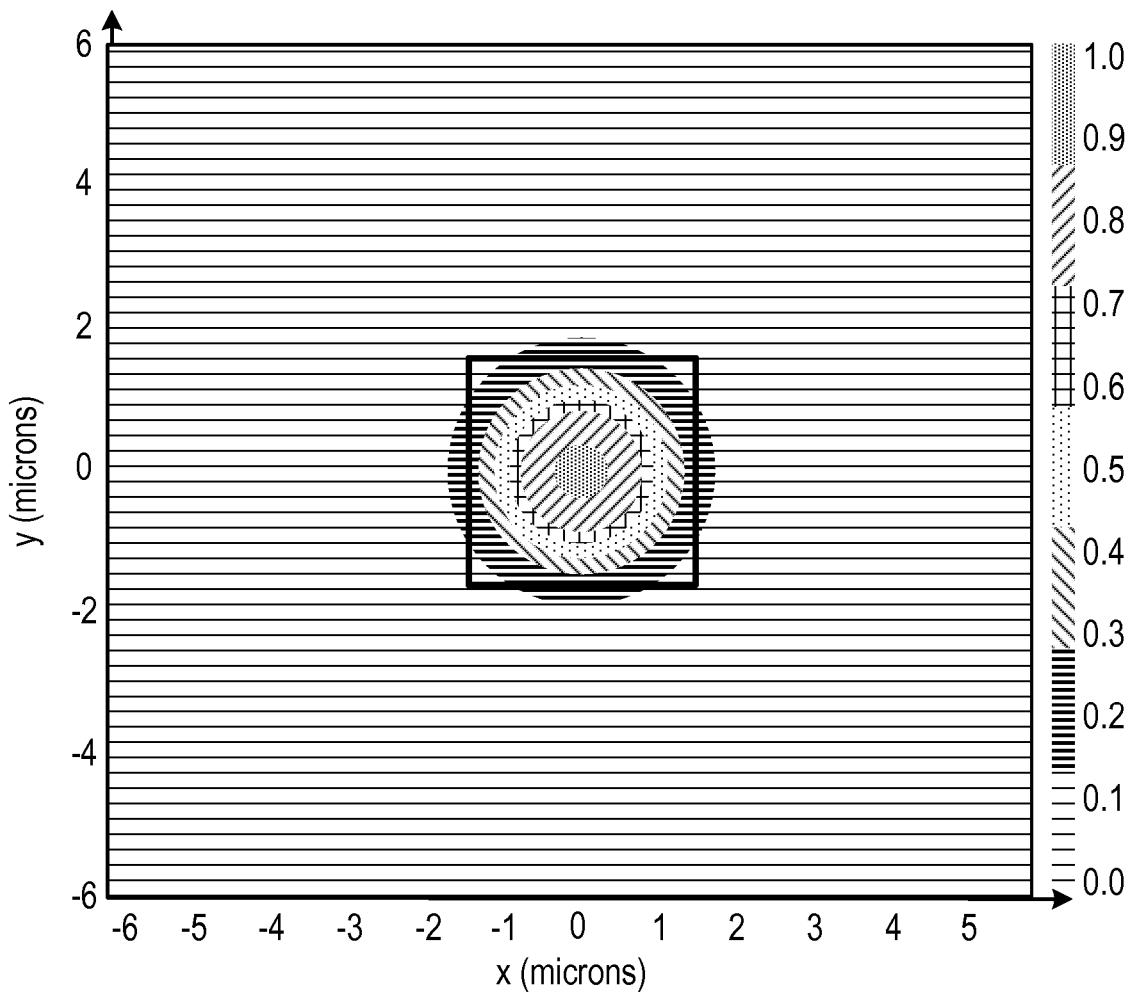
FIG. 8 illustrates a mode size of a semiconductor optical amplifier, SOA.

An example of the specific input mode size delivered at the SSC, as input by a real SOA chip, is shown in FIG. 8.

With the design parameters of the SSC indicated in the list below for an SSC configured as shown in the embodiment of FIGS. 3a to 3c, the simulated coupling loss is about 0.8 dB with ideal horizontal and vertical alignment.

Example Dimensions of Optical Coupler:

First waveguide element 45:

Layer thickness of silicon first waveguide element 45=220 nm

Total length $L_{WG1}$ of first waveguide element 45=25 μm (i.e. total taper length)

First width at first end 45a of first waveguide element 45=500 nm

Second width at second end 45b of second waveguide element 45=100 nm

Second waveguide element 43:

Layer thickness of $Si_3N_4$ second waveguide element 43=70 nm

Total length $L_{WG2}$ of second waveguide element 43=25 μm

Third width at first end 43a of second waveguide element=3 μm

Fourth width at constant width region $43_2$ of second waveguide element=4 μm

Fifth width at second end 43b of second waveguide element 43=1.5 μm

Relative Dimensions:

Distance between second end 45b of first waveguide element 45 and the second end (left side) of optical coupler, $L_4$ of FIG. 3b, equals 1 μm.

Distance between second end 43b of second waveguide element 43 and the first end (right side) of optical coupler, equals 1 μm.

In the example above it can be seen that the first and second waveguide elements 45, 43 have different thicknesses, whereas in the drawings the thicknesses appear to be the same. This is because the drawings are not to scale, but provided for illustrative purposes only.

Furthermore, in some examples, the first waveguide element 45 and the second waveguide element 43 may be separated, for example by a thin gap, or by a thin layer of material, such as silicon dioxide, $SiO_2$. For example, a separation of between 0 to 1 μm, for example 70 nm, may be provided between a first waveguide element 45, for example a SOI waveguide, and a second waveguide element 43, for example a $Si_3N_4$ waveguide, wherein the separation is provided by a layer of material such as SiO₂. Such a layer may be provided in some technological processes, for example where the etching of the silicon nitride waveguide can damage the silicon waveguide underneath. For this reason, first a very thin layer, e.g. 70 nm of SiO₂ may be deposited on top of the silicon layer, and then the silicon nitride layer is deposited and etched. Thus, in some examples a layer ranging from 0 to 1 µm can be deposited between the first waveguide element 45 and the second waveguide element 43. It is noted that such a layer may be provided in any of the embodiments described herein.

Figure 9A:
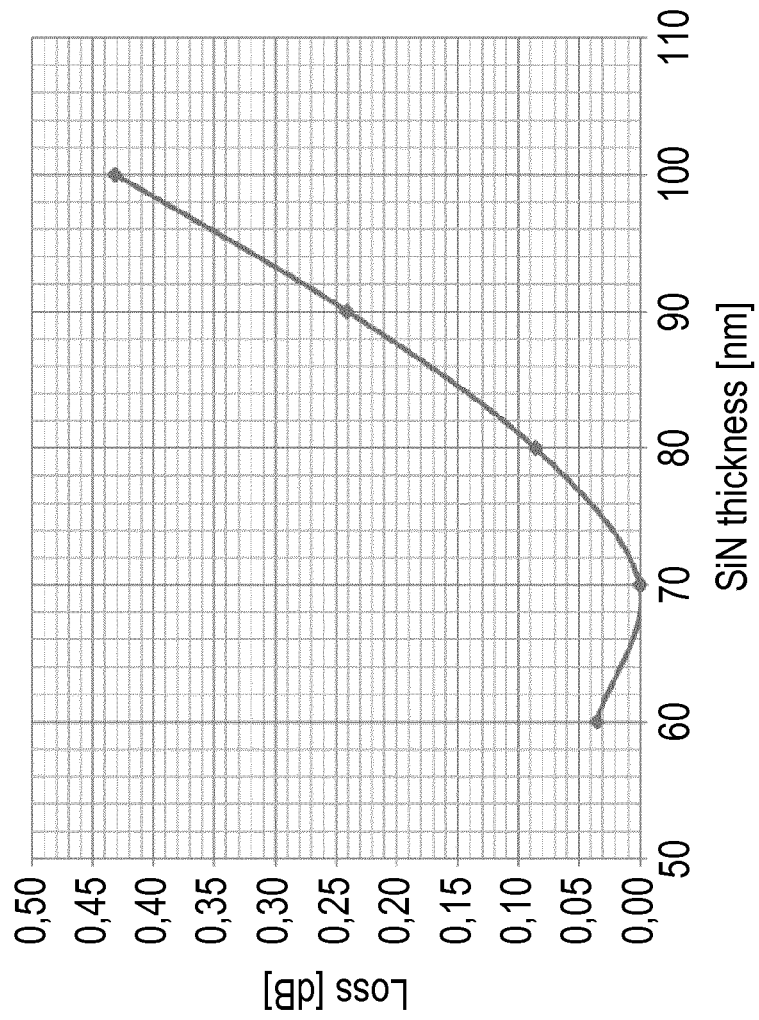
FIGS. 9a and 9b illustrate the tolerance on waveguide thickness production errors to coupling loss.
Figure 9B:
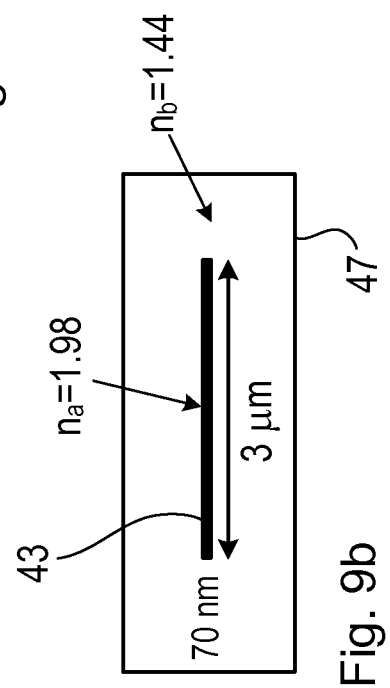

FIGS. 9a and 9b illustrate the tolerance to errors in the thickness of the second waveguide element 43. FIG. 9b shows an end view of the first waveguide element 43 as defined in the list above, i.e. having an ideal thickness of 70 nm and a width (the "third" width of FIGS. 3a to 3c) of 3 µm, surrounded by a cladding layer 47. In this example the refractive in $n_a$ of the silicon nitride waveguide element 43 is shown as being 1.98, while the refractive index $n_b$ of the cladding layer 47 is shown as being 1.44. As can be seen from the table and graph of FIG. 9a, with an error of +/−10 nm around the ideal thickness of 70 nm, the extra loss is negligible (0.04 dB at a thickness of 60 nm, and 0.09 dB at a thickness of 80 nm).

Figure 10A:
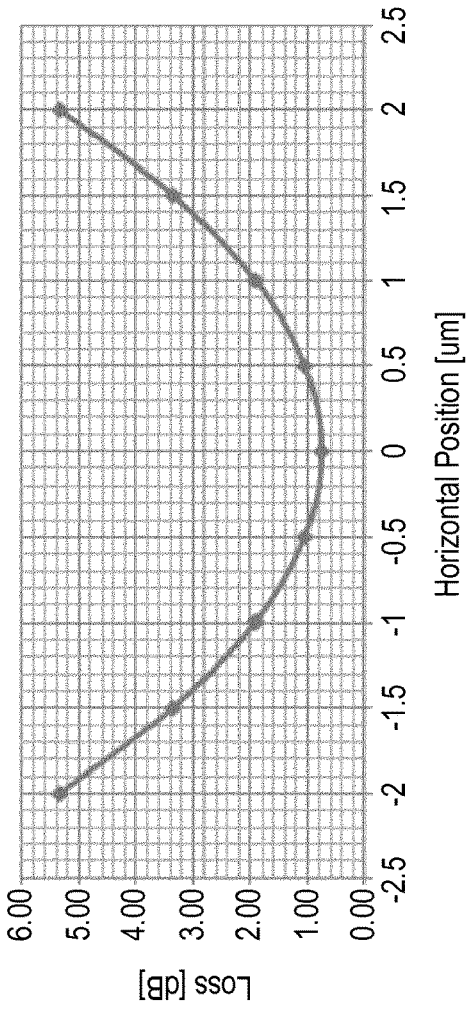
FIGS. 10a and 10b illustrate the effect of alignment tolerances on coupling loss.
Figure 10B:
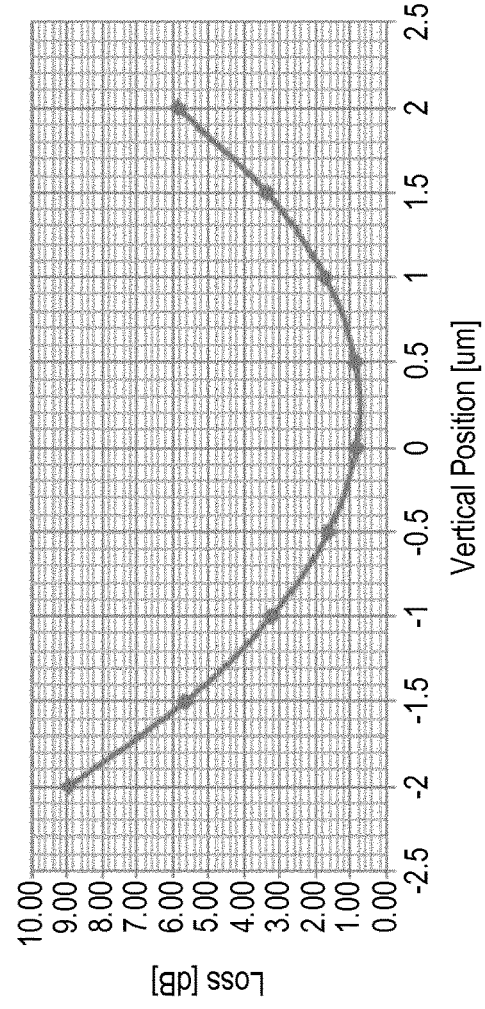

FIGS. 10 and 10b illustrate the tolerance of an optical coupler as described herein to alignment errors.

FIG. 10a shows the tolerance to horizontal position. As can be seen, with a horizontal misalignment of +/−1 µm the extra loss is about 1 dB, which is a figure suitable for allowing passive alignment by a typical flip-chip machine.

FIG. 10b shows the tolerance to vertical position. As can be seen, the optical coupler is less tolerant to vertical alignment. However, this is not an issue because in the vertical axis it is relatively easy to achieve high accuracy because the SOA is placed in contact with the BOX layer, and that accuracy may also be increased by using pedestals in the BOX layer.

Figure 11:
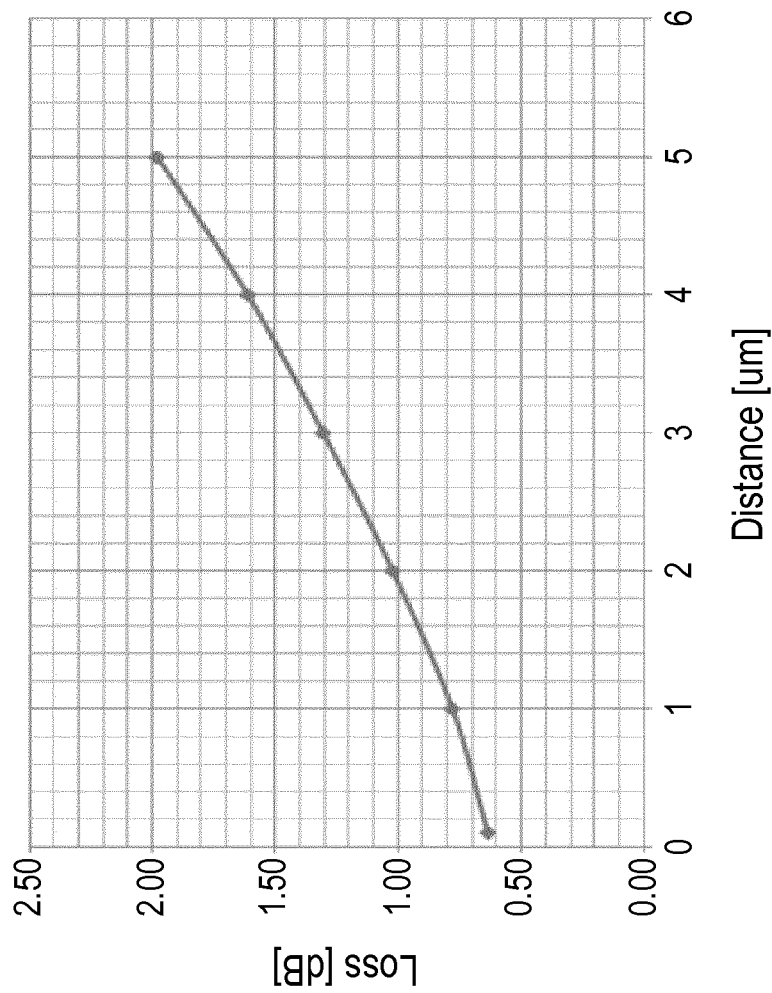
FIG. 11 illustrates the effect of spacing between a light source and the first waveguide element of the optical coupler, during use, to coupling loss.

FIG. 11 illustrates the effect of the spacing, during use, of the spacing between the SOA/laser module 61 of FIG. 5 and the first waveguide element 43 of the optical coupler 40; 50 of FIG. 5 (for example simulated without anti-reflection, A/R, coating at the SOA facet, the A/R coating being an option to help avoid that the light is reflected back at the interface between the two materials). As can be seen from FIG. 11, the optical coupler is quite tolerant to spacing errors.

The embodiments described above provide an optical coupler, for example a SSC, having a new circuit configuration and a new geometry. In some examples this new geometry makes use of a silicon nitride material having an index of refraction higher than silica.

The embodiments described herein have an advantage of being able to provide an optical coupler which, for example, is a few tens of micrometer long, compared to lengths of several hundred micrometers for existing SSC designs. The ability to provide a SSC having a small size is particularly advantageous in target applications such as those involving the integration of SOA/laser with a silicon photonic substrate in high integration scale photonic system on chip. In such applications the higher miniaturization results in a higher bandwidth density of the chip.

Furthermore, the embodiments described herein are much smaller than the SSCs of the prior art without impacting on the performances in terms of coupling loss and alignment tolerance. The embodiments therefore enable the density of the photonic integrated circuit in a silicon photonic system on chip to be increased.

The embodiments described herein are also efficient to manufacture, requiring just first and second masking levels for the formation of the geometry comprising a first waveguide element (e.g. silicon waveguide) and the second waveguide element (e.g. silicon nitride waveguide). This can be particularly advantageous to realize mass-producible optical couplers with low cost and good performance.

It should be noted that the above-mentioned embodiments illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. An optical coupler comprising:
   a substrate;
   a first waveguide element provided in a first layer with respect to the substrate, wherein the first waveguide element comprises a first end and a second end, and wherein the first end of the first waveguide element is coupled to input light into a first end of the optical coupler or to output light from the first end of the optical coupler; and
   a second waveguide element provided in a second layer, the second layer arranged adjacent to the first layer, wherein the second waveguide element comprises a first end and a second end, and wherein the first end of the second waveguide element is coupled to input light into a second end of the optical coupler or to output light from the second end of the optical coupler;
   wherein the first waveguide element is configured to extend from the first end of the optical coupler towards the second end of the optical coupler, and wherein the second waveguide element is configured to extend from the second end of the optical coupler towards the first end of the optical coupler, such that the first waveguide element overlaps with the second waveguide element to adapt light passing between the first end of the first waveguide element and first end of the second waveguide element,
   wherein a length between the first end of the first waveguide element and the second end of the first waveguide element is shorter than a length between the first end of the optical coupler and the second end of the optical coupler, and
   wherein a length between the first end of the second waveguide element and the second end of the second waveguide element is shorter than a length between the first end of the optical coupler and the second end of the optical coupler.

2. The optical coupler of claim 1, wherein an aspect ratio of the first end of the second waveguide element is:
   less than one; or
   substantially less than one.

3. The optical coupler of claim 1, wherein a numerical aperture of the first end of the second waveguide element is configured to match the numerical aperture of an external light source coupled thereto.

4. The optical coupler of claim 1, wherein the first waveguide element tapers in width from having a first width at the first end of the first waveguide element to having a second width at the second end of the first waveguide element.

5. The optical coupler of claim 4, wherein the width of the first waveguide element tapers uniformly from the first width at the first end of the first waveguide element to a point at the second end of the first waveguide element.

6. The optical coupler of claim 1, wherein the first waveguide element comprises a first section having a constant first width from the first end of the first waveguide element, and a second section that tapers from the constant width section to a smaller second width at the second end of the first wave-guide element.

7. The optical coupler of claim 1, wherein the second waveguide element comprises:
an expansion region;
a constant width region; and
a compression region;
wherein the expansion region comprises an increasing width from a first width at the first end of the second waveguide element to a larger, second width, at an interface with the constant width region, and wherein the constant width region comprises the second width between the expansion region and the compression region, and wherein the compression region tapers from the second width to having a smaller, third width, at the second end of the second waveguide element.

8. The optical coupler of claim 1, wherein the second waveguide element comprises:
an expansion region; and
a compression region;
wherein the expansion region comprises an increasing width from a first width at the first end of the second waveguide element to a larger, second width, at an interface with the compression region, and wherein the compression region reduces in width from the second width to having a smaller, third width, at the second end of the second waveguide element.

9. The optical coupler of claim 1, wherein the second waveguide element comprises:
an expansion region;
a constant width region; and
a compression region;
wherein the expansion region comprises an increasing width from a first width at the first end of the second waveguide element to a larger, second width, at an interface with the constant width region, and wherein the constant width region comprises the second width between the expansion region and the compression region, and wherein the compression region tapers from the second width to having a smaller, third width, at the second end of the second waveguide element; and
wherein the first waveguide element is configured to overlap with the second waveguide element such that:
the second end of the first waveguide element is aligned substantially with the interface between the expansion region and the compression region of the second waveguide element; or
the second end of the first waveguide element overlaps at least partially with the expansion region of the second waveguide element; or
the second end of the first waveguide element is aligned within boundaries of the constant width region of the second waveguide element; or
the second end of the first waveguide element is aligned substantially with the interface between the constant width region and the compression region of the second waveguide element; or
the second end of the first waveguide element is aligned substantially with the interface between the expansion region and the constant width region of the second waveguide element; or
the second end of the second waveguide element overlaps with a taper section of the first waveguide element; or
the second end of the second waveguide element overlaps with a taper section and part of a constant width section of the first waveguide element.

10. The optical coupler of claim 1, wherein:
the first waveguide element comprises a constant thickness in the first layer; and/or
the second waveguide element comprises a constant thickness in the second layer.

11. The optical coupler of claim 1, wherein the first end of the first waveguide element abuts the first side of the optical coupler, and wherein the first end of the second waveguide element abuts the second side of the optical coupler, such that light can be coupled between the first and second ends of the optical coupler.

12. The optical coupler of claim 1, wherein the first waveguide element is formed of silicon (Si).

13. The optical coupler of claim 1, further comprising a cladding layer surrounding the second waveguide element, and wherein the second waveguide element is formed from a material having a refractive index higher than the cladding layer.

14. The optical coupler of claim 13, wherein the refractive index of the cladding layer is lower than the refractive index of the second waveguide element, and higher than the refractive index of a third layer provided between the first waveguide element and the substrate.

15. The optical coupler of claim 14, wherein the cladding layer comprises silicon dioxide ($SiO_2$).

16. The optical coupler of claim 14, wherein the cladding layer comprises non stoichiometric silicon dioxide ($SiO_x$).

17. The optical coupler of claim 14, wherein the third layer comprises a buried oxide (BOX) layer.

18. The optical coupler of claim 1, wherein the second waveguide element is formed of silicon nitride ($Si_3N_4$).

19. The optical coupler of claim 1, wherein the optical coupler comprises a spot-size converter (SSC) for coupling light between a first module having a light signal comprising a first mode shape, and a second module having a light signal comprising a second mode shape, and wherein the optical coupler is configured to adapt light between the first mode shape and the second mode shape, or vice versa.

20. The optical coupler of claim 1, wherein the first waveguide element and the second waveguide element are adjacent to each other.

21. A semiconductor photonic device comprising:
a first optical module;
a second optical module; and
an optical coupler for coupling light between the first optical module and the second optical module, wherein optical coupler comprises:
a substrate;
a first waveguide element provided in a first layer with respect to the substrate, wherein the first waveguide element comprises a first end and a second end, and wherein the first end of the first waveguide element is coupled to input light into a first end of the optical coupler or to output light from the first end of the optical coupler; and
a second waveguide element provided in a second layer, the second layer arranged adjacent to the first layer, wherein the second waveguide element comprises a first end and a second end, and wherein the first end of the second waveguide element is coupled to input light into a second end of the optical coupler or to output light from the second end of the optical coupler;

wherein the first waveguide element is configured to extend from the first end of the optical coupler towards the second end of the optical coupler, and wherein the second waveguide element is configured to extend from the second end of the optical coupler towards the first end of the optical coupler, such that the first waveguide element overlaps with the second waveguide element to adapt light passing between the first end of the first waveguide element and first end of the second waveguide element, wherein a length between the first end of the first waveguide element and the second end of the first waveguide element is shorter than a length between the first end of the optical coupler and the second end of the optical coupler, and wherein a length between the first end of the second waveguide element and the second end of the second waveguide element is shorter than a length between the first end of the optical coupler and the second end of the optical coupler.

22. A method of forming an optical coupler, the method comprising:
providing a substrate;
forming a first waveguide element in a first layer with respect to the substrate, wherein the first waveguide element comprises a first end and a second end, and wherein the first end of the first waveguide element is coupled to input light into a first end of the optical coupler or to output light from the first end of the optical coupler; and
forming a second waveguide element in a second layer, the second layer formed adjacent to the first layer, wherein the second waveguide element comprises a first end and a second end, and wherein the first end of the second waveguide element is coupled to input light into a second end of the optical coupler or to output light from the second end of the optical coupler;
wherein the first waveguide element is formed to extend from the first end of the optical coupler towards the second end of the optical coupler, and wherein the second waveguide element is formed to extend from the second end of the optical coupler towards the first end of the optical coupler, such that the first waveguide element overlaps with the second waveguide element to adapt light passing between the first end of the first waveguide element and first end of the second waveguide element,
wherein a length between the first end of the first waveguide element and the second end of the first waveguide element is shorter than a length between the first end of the optical coupler and the second end of the optical coupler, and
wherein a length between the first end of the second waveguide element and the second end of the second waveguide element is shorter than a length between the first end of the optical coupler and the second end of the optical coupler.

23. The method of claim 22, wherein the second waveguide element is formed such that an aspect ratio of the first end of the second waveguide element is:
less than one; or
substantially less than one.

24. The method of claim 22, wherein the second waveguide element is formed such that a numerical aperture of the first end of the second waveguide element is configured to match the numerical aperture of an external light source coupled thereto.

25. The method of claim 22, further comprising:
forming the first waveguide element to taper from having a first width at the first end of the first waveguide element to having a second width at the second end of the first waveguide element; or
forming the first waveguide element to comprise a first section having a constant first width from the first end of the first waveguide element, and a second section that tapers in width from the constant width section to a smaller second width at the second end of the first waveguide element.

26. The method of claim 22, further comprising forming the second waveguide element to comprise:
an expansion region; and
a compression region;
wherein forming the expansion region comprises forming an increasing width from a first width at the first end of the second waveguide element to a larger, second width, at an interface with the compression region; and
wherein forming the compression region comprises forming a tapering width from the second width to a smaller, third width, at the second end of the second waveguide element.

27. The method of claim 22, further comprising forming the second waveguide element to comprise:
an expansion region;
a constant width region; and
a compression region;
wherein forming the expansion region comprises forming an increasing width from a first width at the first end of the second waveguide element to a larger, second width, at an interface with the constant width section; and
wherein forming the constant width region comprises forming a region having the second width between the expansion region and the compression region; and
wherein forming the compression region comprises forming a tapering width from the second width to a smaller, third width, at the second end of the second waveguide element.

28. The method of claim 22, wherein the first waveguide element is formed of silicon (Si) and/or wherein the second waveguide element is formed of silicon nitride ($Si_3N_4$).

29. The method of claim 22, wherein the first waveguide element and second waveguide element of the optical coupler are formed using first and second masks using complementary metal oxide semiconductor (CMOS) processing techniques.

* * * * *